United States Patent [19]

Maiville

[11] Patent Number: 5,099,883
[45] Date of Patent: Mar. 31, 1992

[54] LOW SPILL IDENTICAL HALF COUPLING

[75] Inventor: Randolph L. Maiville, Onondaga, Mich.

[73] Assignee: Aeroquip Corporation, Maumee, Ohio

[21] Appl. No.: 634,837

[22] Filed: Dec. 27, 1990

[51] Int. Cl.$^5$ .................. F16K 37/08; F16K 25/00
[52] U.S. Cl. ......................... 137/614.06; 251/149.9
[58] Field of Search ............ 137/614.06, 614, 637.05; 251/149.9, 162, 149.5; 285/85

[56] References Cited

U.S. PATENT DOCUMENTS

| | | | |
|---|---|---|---|
| 3,423,063 | 1/1969 | German | 251/149.9 X |
| 3,618,892 | 11/1971 | Sciuto, Jr. | 251/149.9 X |
| 4,438,779 | 3/1984 | Allread | 251/149.9 X |
| 4,577,659 | 3/1986 | Gembus et al. | 137/637.05 X |
| 4,664,149 | 5/1987 | Fremy | 137/614.06 |

Primary Examiner—Martin P. Schwadron
Assistant Examiner—Kevin L. Lee

[57] ABSTRACT

A ball valve type fluid coupling having identical interconnectable parts characterized by low fluid spillage during disconnection. The rotatable ball valve is axially displaceable by cam structure along the flow passage as the valve is rotated between open and closed positons which prevents the valve from passing through the plane of the coupling connection end during valve operation and the valve exterior surface includes a flat coupling connection end sealing surface substantially coplanar to the coupling connection end when the valve is closed to reduce trapping fluid and spillage.

18 Claims, 7 Drawing Sheets

LOW SPILL IDENTICAL HALF COUPLING

BACKGROUND OF THE INVENTION

Ball valves are used in fluid couplings when high flow capacity and low flow restriction is desired. Generally, the ball valve is of a spherical configuration having a large diametrical bore extending therethrough and the valve is located within the flow passage of a coupling or fitting in a sealed manner and rotation of the valve 90° fully opens or closes the valve. The spherical configuration of the ball valve is normally accommodated within the coupling configuration. A typical identical half coupling of this type is shown in the assignee's U.S. Pat. No. 4,438,779.

However, when it is desired to use valved couplings or fittings wherein low fluid spillage is required upon disconnection of the coupling parts ball valves are not employed as the spherical configuration of the ball valve causes voids to exist in the connection end face of the coupling wherein fluid is trapped and escapes to the atmosphere and earth upon disconnection of the coupling parts. When ball valves are employed with identical half or "unisex" couplings it is necessary to locate the ball valves inwardly from the associated coupling part connection end to prevent interference of the ball valve with the other coupling structure or valve and under conventional coupling constructions of the identical part type utilizing ball valves the requirement to inwardly locate the ball valves to prevent interference during valve operation creates fluid trapping cavity and voids rendering such couplings environmentally unacceptable when used with corrosive or toxic fluids, or highly concentrated fluids such as fertilizer. As the excellent flow characteristics of ball valves make this type of coupling highly desirable a significant need exists for ball valve couplings or fittings which have low spillage or fluid loss characteristics during disconnection, but previously, such coupling parts have not been available.

OBJECTS OF THE INVENTION

It is an object of the invention to provide a coupling part for an identical half coupling utilizing a ball valve wherein fluid spillage and loss is significantly reduced as compared with previous ball valve couplings.

Another object of the invention is to provide an identical coupling half utilizing a high flow capacity ball valve wherein the valve includes a flat exterior sealing surface which becomes substantially coplanar with the coupling part connection end when the valve is in the closed position.

An additional object of the invention is to provide a fluid coupling having identical coupling parts wherein the parts utilize ball valves positionable between open and closed conditions and the ball valves are axially displaceable within the associated coupling part flow passage during rotation between the open and closed positions to prevent interference with the interconnected coupling part, and the axial displacement also minimizes spillage during coupling part disconnection.

Yet another object of the invention is to provide a ball valve type coupling which utilizes the high capacity flow and low pressure loss characteristics of ball valves, and is free of the clearance and high spillage characteristics of conventional ball valve couplings.

SUMMARY OF THE INVENTION

The invention pertains to fluid couplings of the identical coupling part type wherein each coupling part includes a ball valve for controlling fluid flow therethrough. Each coupling part includes an end connectable to a hose or the like, and each coupling part includes a coupling connection end having connectors formed thereon whereby the coupling parts may be interconnected in a fluid tight relationship permitting fluid to pass between the parts when the valves are open.

Each of the coupling parts' connection end is substantially flat and located within a plane perpendicular to the coupling part flow passage axis.

A ball valve is mounted within the coupling part flow passage adjacent the coupling connection end. The ball valve includes a diametrical bore of a diameter substantially equal to the effective coupling part flow passage whereby opening of the valve permits fluid to flow substantially unrestricted through the coupling passage while a 90° rotation of the valve closes the flow passage. An annular seal is located within the coupling part concentric to the flow passage and engageable by the ball valve at its open and closed positions to render the coupling fluid tight under closed conditions. An annular sleeve biased by a compression spring forces the ball valve toward the seal to insure the sealed relationship.

A flat coupling connection end sealing surface is defined upon the exterior of the ball valve which is located within the intersection of the associated coupling part flow passage with the coupling connection end and the valve coupling connection end sealing surface is so positioned as to be substantially coplanar with the associated coupling connection end when the valve is in the closed position. This coplanar relationship eliminates the usual voids that exist adjacent ball valves and provides the very low spillage characteristics of a coupling constructed in accord with the invention.

The aforementioned operation of the valve can only be achieved if the ball valve is located very close to the coupling connection end and interference and clearance problems are encountered when mounting conventional ball valves in the above described relationship as the valves are rotated between the open and closed positions. The large diameter of the ball valve bore requires the bore to intersect the ball valve exterior surface well short of the diameter of the ball valve as defined by the bore axis. Accordingly, as the valve is rotated 90° from the open to the closed positions, normally, the exterior surface of the valve would axially extend through the coupling part connection end plane interfering with the other coupling part structure creating significant operational and dimensional problems.

To overcome the aforementioned characteristics of ball valves the invention mounts a cam upon the ball valve which engages a cam surface defined on the coupling part which causes the ball valve to be axially displaced "inwardly" as the valve is rotated between its open and closed positions. This valve axial displacement prevents the valve from extending through the associated coupling part connection end plane and eliminates interference and clearance problems while permitting the coupling connection end sealing surface defined on the valve to be substantially coplanar with the coupling connection end when the ball valve is closed to reduce the fluid spillage during coupling disconnection.

As the valve cam axially displaces the valve inwardly within the coupling part such axial displacement is accommodated by the valve support and operating mechanism. The compression spring biasing the annular sleeve against the valve toward the valve seal will be momentarily compressed by the valve displacement produced by the cam and the spring and sleeve will maintain the cam and cam surface in engagement, and also assure a fluid tight engagement between the seal and the valve when in the open and closed positions.

Rotation of the ball valve about its operating axis, which is perpendicular to the coupling flow passage axis, is through a radial shaft rotatably mounted within the coupling part. The outer end of the shaft includes a manual handle for rotating the shaft between the valve open and closed positions. The inner end of the shaft constitutes a slide which is slidably received within a slot formed in the valve exterior surface. The slidable relationship between the shaft slide and valve slot permits the desired axial displacement of the valve while maintaining a drive connection between the shaft and valve capable of transmitting the necessary torque to the valve to rotate it between the open and closed positions. If desired, an anti-friction slide utilizing rollers may be attached to the shaft inner end.

Coupling parts constructed in accord with the inventive concepts permit an identical part coupling to be constructed which is of concise configuration having full flow low pressure loss characteristics, and yet, very low spillage occurs during disconnection. Couplings constructed in accord with the invention have only 10% of the spillage experienced with conventional couplings employing ball valves and couplings in accord with the invention are highly desirable for their environmental advantages.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
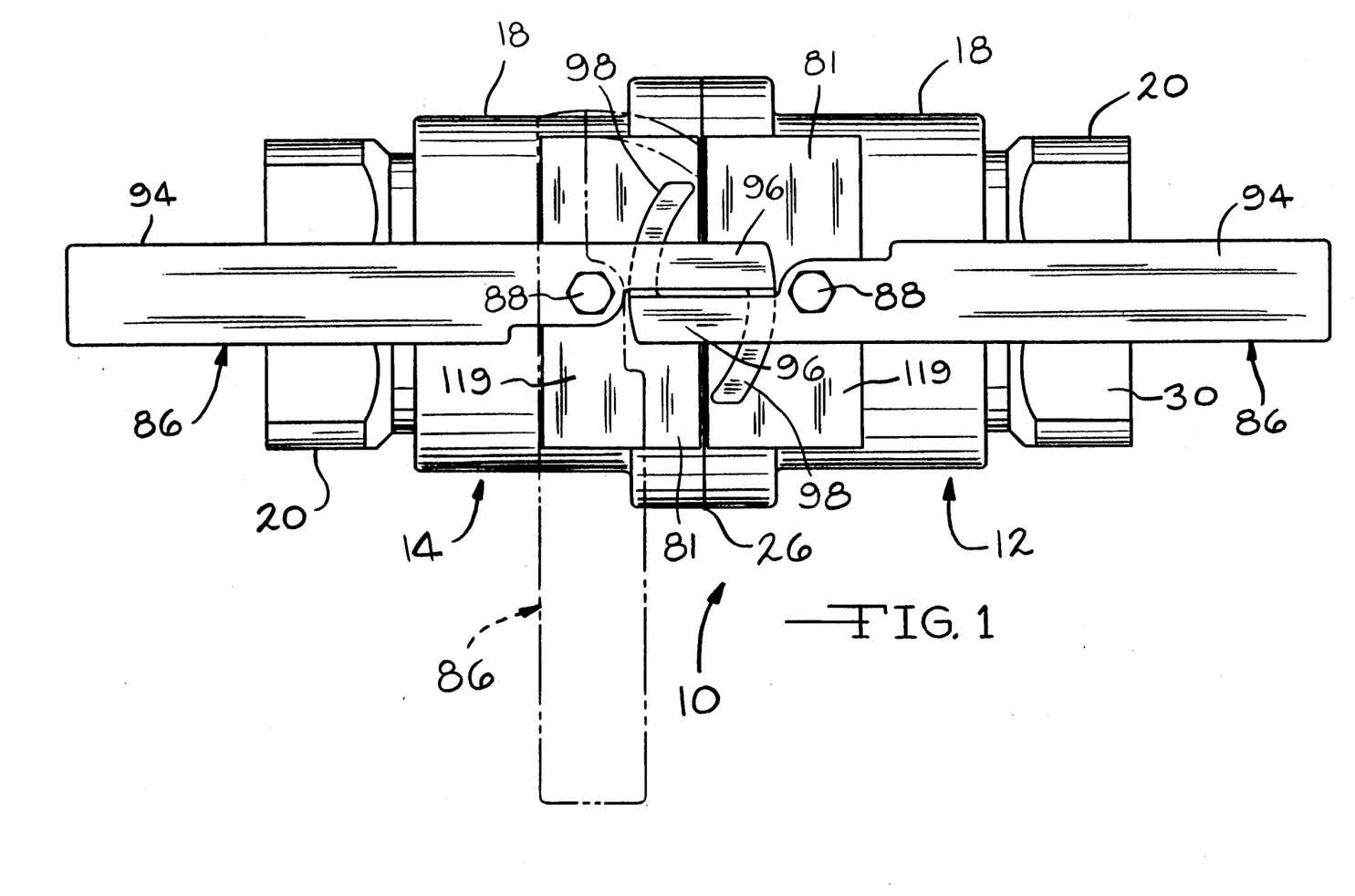
FIG. 1 is a top plan view of a fluid coupling constructed in accord with the invention illustrating the coupling parts in interconnected relationship, the valve handles being shown in the valve open-coupling connected position in full lines, and the left valve handle being shown in the closed position in phantom lines.
Figure 7:
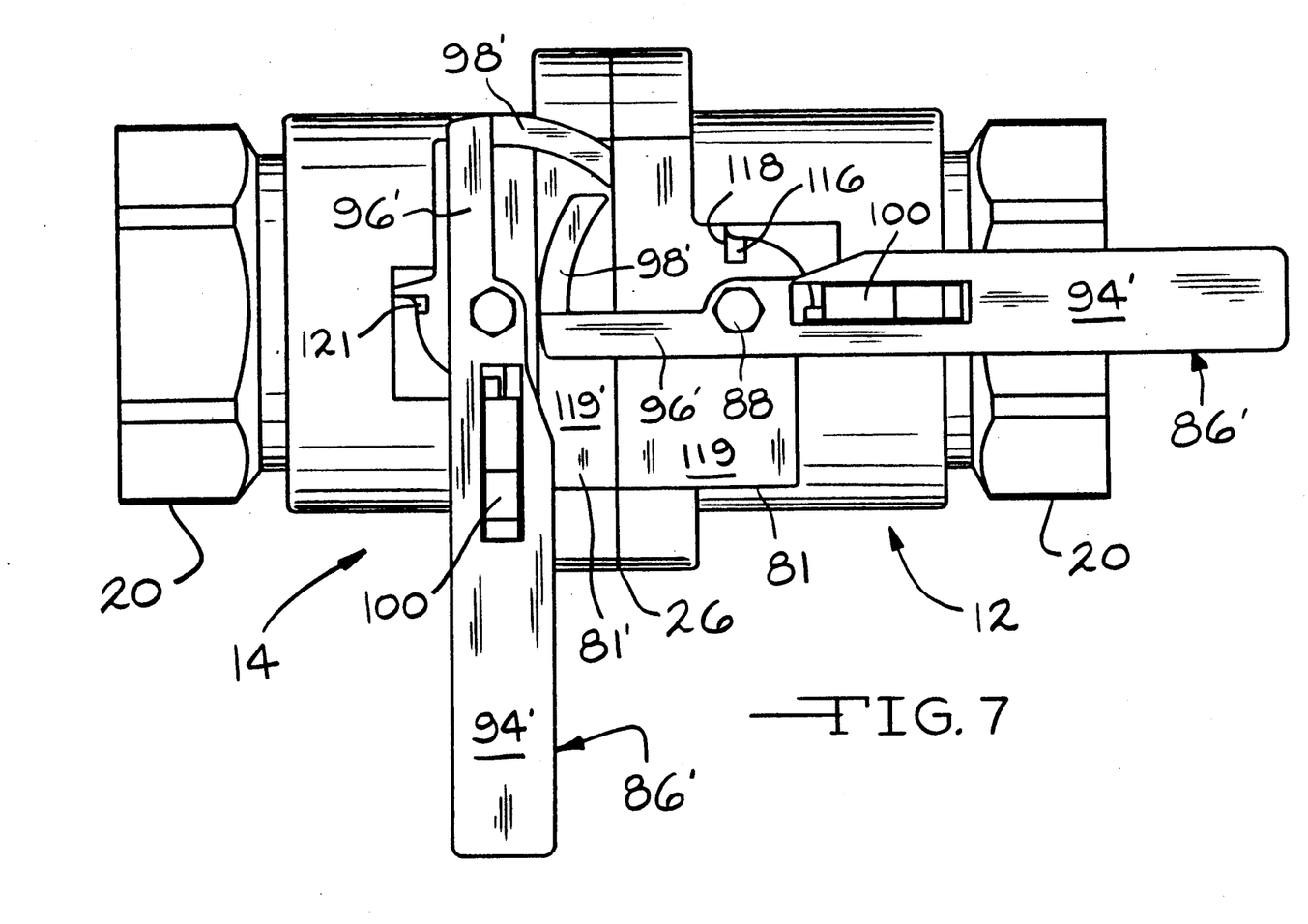
FIG. 7 is a top plan view of a coupling in accord with the invention, the right valve operating handle being shown in the valve open position, and the left valve operating handle being shown in the closed position, and a security latch being shown in the valve operating handle.

With reference to FIGS. 1 and 7 an entire coupling utilizing interconnected identical coupling parts constructed in accord with the invention is represented at 10. The coupling 10 consists of interconnected parts 12 and 14. As the parts 12 and 14 are identical in all respects it will be appreciated that a description of a single part serves to describe both coupling parts. The advantage of identical or "unisex" coupling parts is the simplification of manufacture and inventory, and the elimination of requiring special configurations for the parts of the coupling is highly advantageous.

With particular reference to FIGS. 2-6, it will be appreciated that a coupling part, such as part 12, includes an annular housing 16 which is formed by an assembled shell 18 and an adapter 20. The housing 16 includes a flow passage generally indicated at 22 axially extending through the housing 16, and the housing includes a conduit connection end 24 at the right end, FIG. 2, and a coupling connection end 26 which is the end of the housing which will be attached to the coupling part 14.

The adapter 20 is of an annular configuration internally provided with threads 28 whereby a hose fitting, not shown, or the like may be threaded into the adapter to supply the fluid to be handled. Exteriorly, the adapter includes wrench flats 30 for receiving a wrench to control rotation of the adapter.

Internally, the adapter 20 includes a cylindrical boss 32 received within a cylindrical surface defined within the shell 18 and sealed thereto by O-ring 34. Retainer washers 36 held within grooves defined in the shell abut against the boss shoulder and maintain the assembly of the adapter 20 and shell 18.

The adapter includes an internal cylindrical bore 38 which receives the annular sleeve 40 having an inner conical surface 42 for engaging the valve as will be described later. The sleeve 40 also includes the bore 44 which defines the effective diameter of the flow passage 22. A compression spring 46 surrounding a portion of the sleeve 40 biases the sleeve toward the left, FIGS. 2-5.

The coupling parts 12 and 14 are interconnected by arcuate connector fingers 48 defined on the shell 18 and axially extending therefrom. The fingers 48 include hooks 50 and each of the coupling connection ends 26 are provided with arcuate recesses 52 for receiving the ends of the fingers 48 and the hooks 50 of the interconnected coupling part. The recesses 52 include enlarged portions for receiving the hooks 50 and constitute bayonet type recesses whereby the fingers 48 may be inserted into the recesses 52 of the aligned coupling part and relative rotation of the coupling parts firmly interconnects the parts. The interrelationship and connection between the fingers and recesses will be readily appreciated from the assignee's U.S. Pat. No. 4,438,779 which is identical thereto.

An annular seal retainer 54 is located within the shell 18 adjacent the coupling connection end 26. The retainer 54 includes a flange 56 engaging a shell interior shoulder so as to axially locate the retainer within the shell. The retainer includes a central opening 58 concentric to the flow passage axis and an interior annular seal ring 60 is mounted within the retainer 54 to provide a sealed relationship with the valve, as later described.

Exteriorly, the retainer 54 is provided with a lip seal 62 concentric to the flow passage axis and the lip seals 62 of the coupling parts 12 and 14 engage upon the coupling parts being interconnected to establish a fluid tight relationship between the parts 12 and 14.

The coupling connection end 26 is of a flat configuration defining a plane as represented by numeral 64 defined by the outer surface of the retainer 54, and it will be appreciated when the coupling parts 12 and 14 are interconnected as shown in FIG. 1 the planes 64 of the parts will be adjacent and substantially contiguous to each other.

An annular cam surface wear plate 66 is located within the retainer 54 concentric to the axis of the flow passage 22 and the purpose of the wear plate 66 will be later apparent.

The coupling part valve is generally indicated at 68. For purpose of description the valve 68 will be described as a ball valve, but as will be appreciated, surfaces defined upon the valve cause the configuration thereof to depart from that of a normal ball valve.

The valve 68 includes a diametrical bore 70 extending through the valve and of a diameter substantially equal to the sleeve bore 44. The exterior surface of the valve 68 is generally spherical, however, a flat coupling connection end seal surface 73 is defined thereon as will be appreciated from FIG. 6 and a similar flat surface 73A is formed on the opposite side of the valve. A pair of aligned cam studs 74 are mounted in the valve and extend from the exterior surface 72 for engagement with the cam wear plate 66, as later explained. Further, the exterior surface 72 of the valve is provided with a linear slot 76 having parallel sides for providing a torque transmitting connection to the valve operator.

The valve 68 is operated by a shaft 78 rotatably mounted within a radial bore 80 defined in the shell 18. The shell 18 includes a boss 81 in which the bore 80 is formed, and the shaft 78 includes an outer end 84 to which the handle 86 is attached by a bolt 88 or by a roll pin 89. The inner end of the shaft 78 is indicated at 90 and includes an elongated block or slide 92 which is closely received within the valve slot 76 in a slidable manner. Accordingly, it will be appreciated that rotation of the shaft 78 by the handle 86 will rotate the valve 68 about the axis of the shaft due tot he torque transmitting interconnection between the slot 76 and the slide 92.

The handle 86 includes an outer end 94 adapted to be grasped by the operator to control the position of the valve. The handle inner end 96 includes an arcuate extension 98 which is offset with respect to the inner end 96 as will be appreciated from FIG. 6. The extension 98 is of a circular configuration concentric to the axis of rotation of the associated handle 86.

Figure 8:
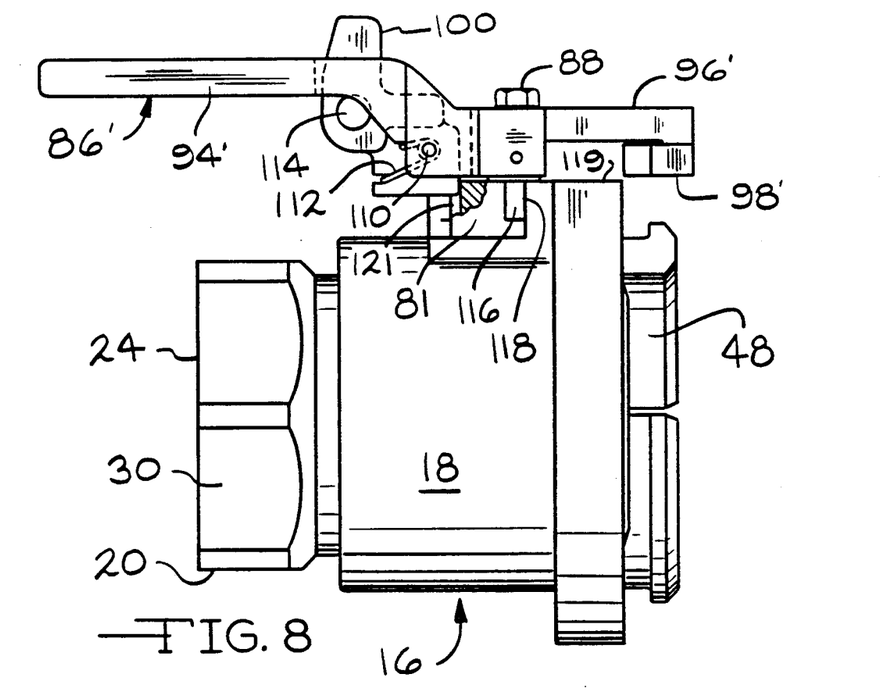
FIG. 8 is a side elevational view of a coupling part in accord with the invention illustrating the valve operating handle in the open position, and a security latch being illustrated in the detent position.
Figure 9:
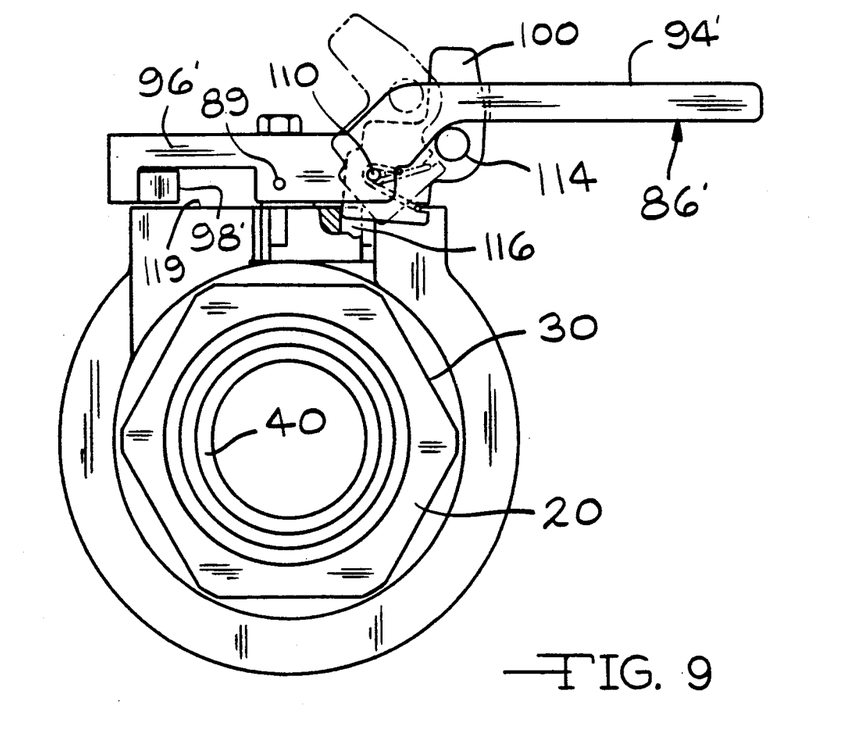
FIG. 9 is an end elevational view illustrating the valve operating handle with a security latch within the handle in the closed position and the latch in position for receiving a padlock shackle.

In FIGS. 1-6 a basic form of handle 86 is illustrated and the basic operation of the coupling components will be understood with respect to the operation of handle 86. In FIGS. 7-9 a version of valve handle is illustrated which includes a security latch and the operation of this handle embodiment will be later described.

Figure 3:
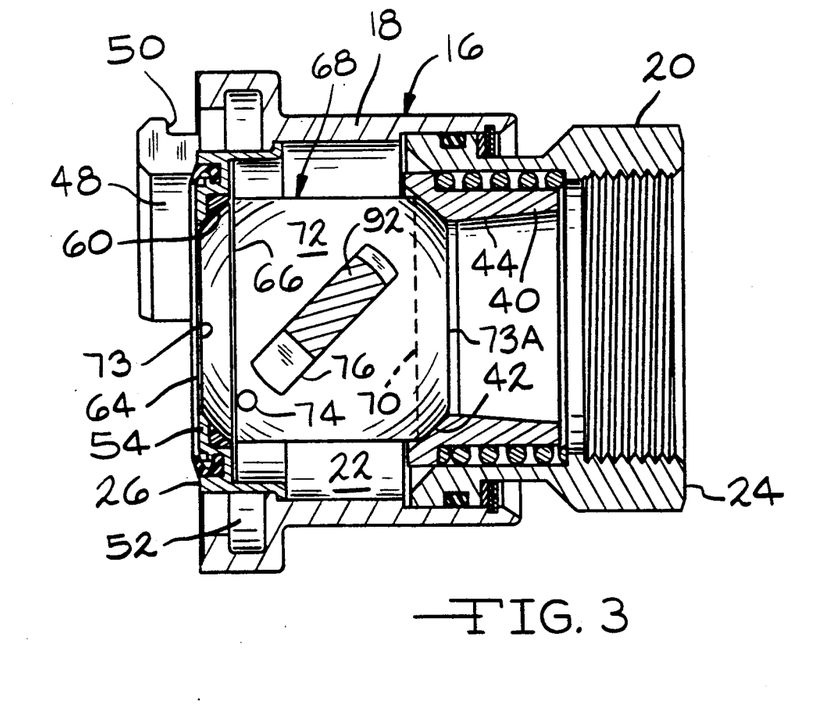
FIG. 3 is a diametrical plan sectional view taken 90° with respect to the view of FIG. 2 as along Section 3—3 illustrating the valve in elevation and in the closed position.

In operation, prior to the interconnection of the coupling parts 12 and 14, the valve 68 will normally be rotated to the off position as represented in FIG. 3. The handle 86 will be disposed at right angles to the length of the associated coupling part and the valve bore 70 will be at right angles to the flow passage 22 as shown in FIG. 3. The conical surface 42 of the sleeve 40 will be engaging the side of the valve exterior surface 72 biasing the exterior surface 72 adjacent the valve flat seal surface 73 into a fluid tight sealing relationship with the interior seal ring 60. The engagement of the valve 68 with the seal ring 60 seals the flow passage 22 through the coupling part 12 and as the coupling connection end seal surface 73 defined upon the valve exterior surface 72 is fully located within the retainer opening 58 and is substantially coplanar with the general plane 64 of the coupling connection end 26, as will be appreciated from FIG. 3, the coupling connection end 26 is substantially devoid of cavities in which fluid could be trapped. The substantially coplanar alignment of the valve surface 73 with the plane 64 produces a relatively flat coupling connection end 26 minimizing the likelihood of foreign matter being trapped on the end 26 and a clean conduit connection end may be readily maintained prior to the interconnection of the coupling parts 12 and 14.

When it is desired to interconnect the coupling parts 12 and 14 the parts are aligned in the manner shown in FIGS. 1 and 7, the connector fingers 48 are inserted into the arcuate recesses 52 defined in the opposing coupling connection end 26, and the parts 12 and 14 are rotated relative to each other a few degrees to align the finger hooks 50 with the radial shoulders of the recesses 52 to establish complete interconnection of the coupling parts. The lip seals 62 will be engaging and compressing each other and a fluid tight interrelationship between the coupling parts is achieved. The above described procedure of interconnection of coupling parts is identical to that shown in the assignee's U.S. Pat. No. 4,438,779.

The valves 68 are now opened by rotating the valves by their associated handle 86. The handles 86 are rotated so that the length of the handles aligns with the length of the associated coupling part, as shown in FIG. 1 in full lines, such pivoting of the handles 86 causes the handle arcuate extensions 98 to pass under the handle inner end 96 of the interconnected coupling part as will be apparent from FIG. 1.

Figure 4:
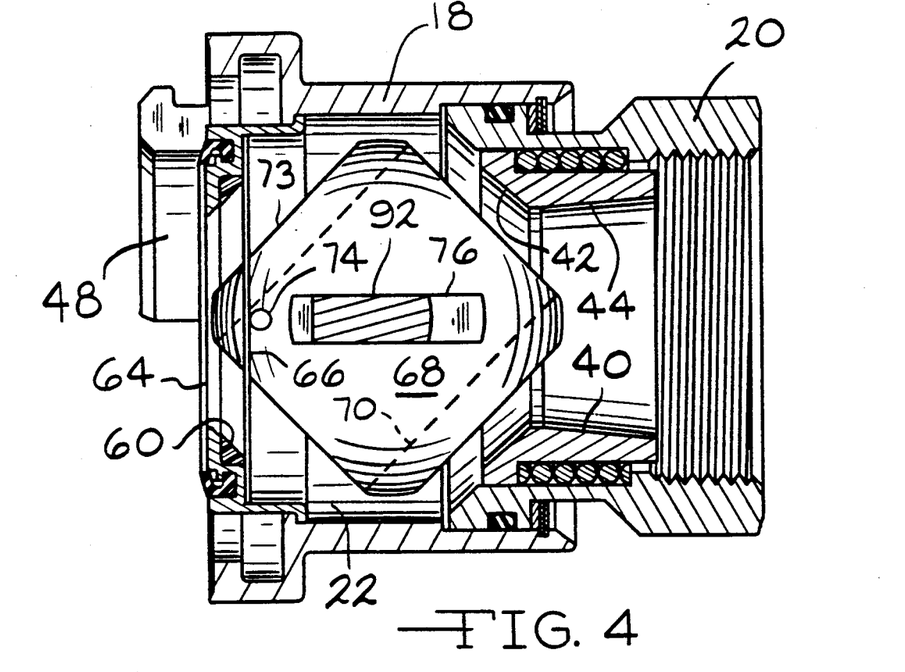
FIG. 4 is a view similar to FIG. 3 illustrating the valve halfway between the open and closed position.
Figure 5:
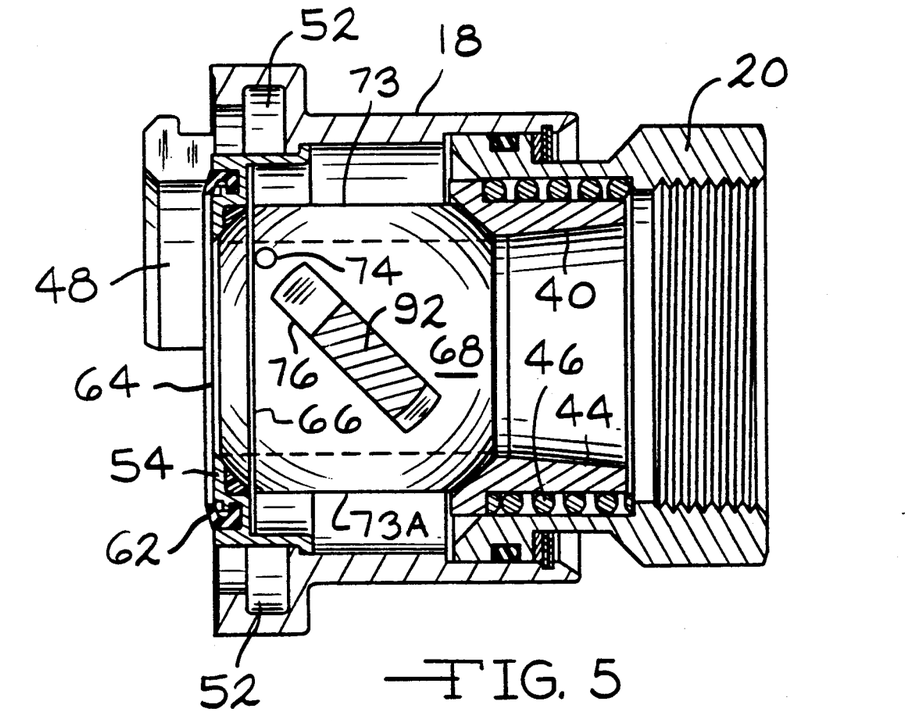
FIG. 5 is a sectional view similar to FIGS. 3 and 4 illustrating the valve in the open position.
Figure 6:
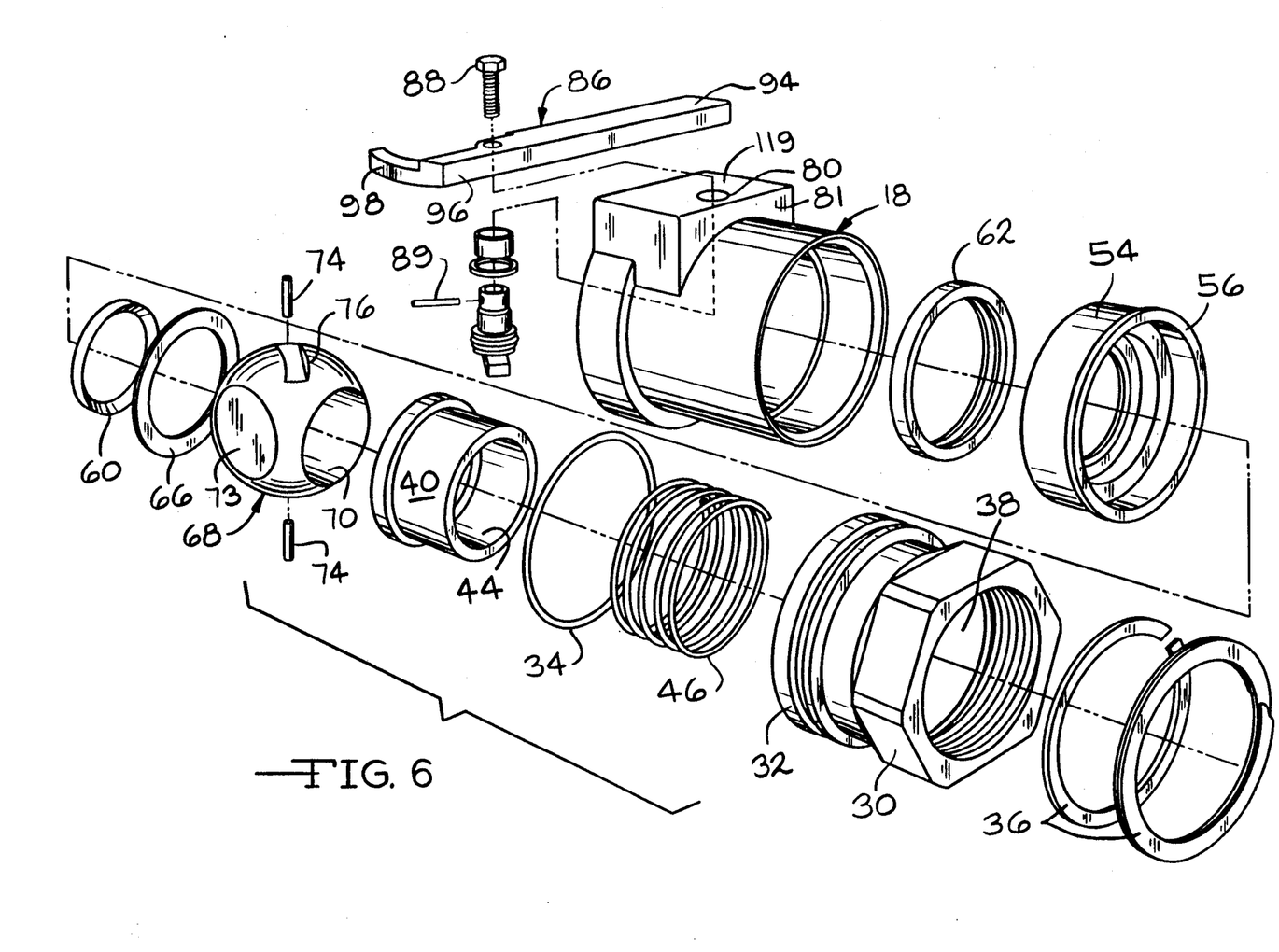
FIG. 6 is an exploded perspective view of a coupling part in accord with the invention.

When rotating the valve 68 from the closed position of FIG. 3 to the open position of FIG. 5 an axial displacement of the valve takes place which is best understood by reference to FIGS. 3-5 where the cam wear plate 66 is illustrated in a non-sectional manner. As will be appreciated from FIG. 3, when the valve 68 is in the closed position the cam studs 74 will be engaging the cam wear plate 66 below the centerline of the flow passage 22. As the valve 68 is rotated in a clockwise direction, FIG. 4, the cam studs 74 will move across the wear plate 66, and in FIG. 4 a half open and closed relationship is shown. In the relationship shown in FIG. 4 portions of the valve exterior surface 72 are still engaged by the sleeve conical surface 42 and the cam studs 74 will be maintained in engagement with the wear plate 66. However, as the valve 68 is rotated the engagement of the cam studs 74 with the plate 66 causes the valve 68, and its axis of rotation, to move to the right, FIG. 4. Such axial displacement of the valve 68 in the axial direction of the flow passage 22 compresses spring 46 and causes the slot 76 to be displaced relative to the shaft slide 92, as will be appreciated from FIG. 4.

The purpose of this axial displacement of the valve 68 is to prevent any portion of the valve 68 from axially extending beyond the general plane 64 of the coupling connection end during operation. Thus, interference with the interconnected coupling part is prevented and the valve 68 may freely rotate from the closed to the open position.

Figure 2:
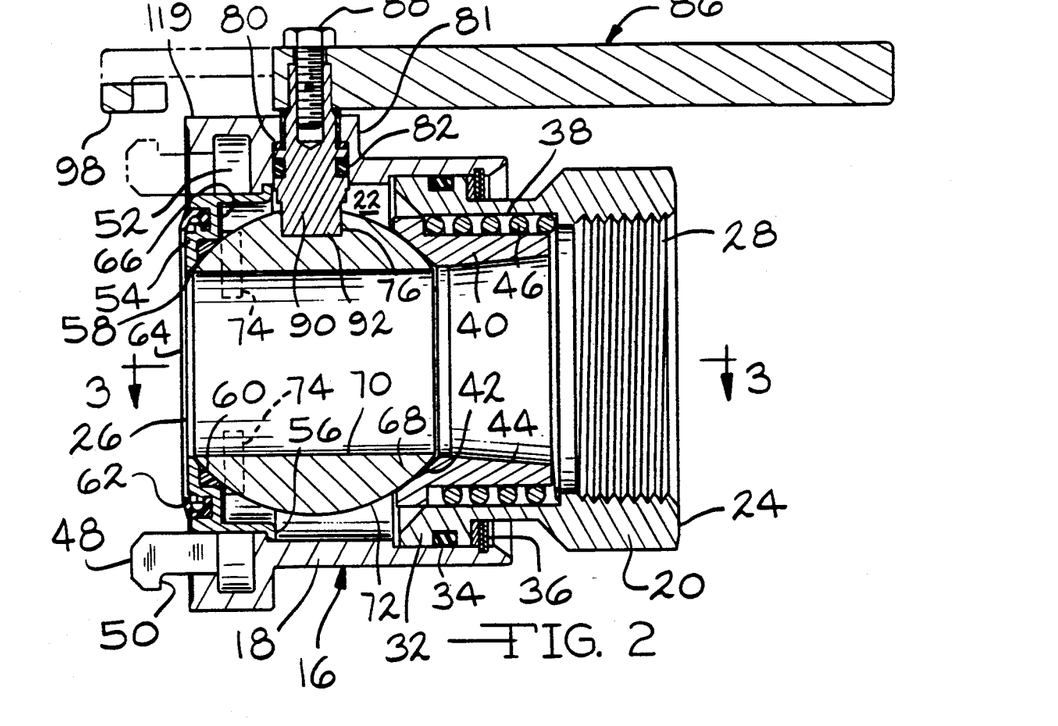
FIG. 2 is a diametrical elevational sectional view of a coupling part in accord with the invention, the valve being shown in the open position.

FIG. 5 illustrates the position of the valve 68 when fully opened, as also shown in FIG. 2. In this position the cam studs 74 will be located above the axis of the flow passage 22, the shaft slide 92 will be located within the valve slot 76 as shown, and the slot 76 will have rotated 90° from the position shown in FIG. 3. The alignment of the valve bore 70 with the retainer opening 58 permits the sleeve 40 to bias the valve 68 into engagement with the interior seal ring 60 again establishing a sealed relationship between the valve and the seal ring 60. With both valves 68 open fluid flow through the coupling 10 occurs and high flow capacity with low pressure loss is achieved in view of the valve bore 70 having a diameter substantially as large as the smallest diameter in the coupling part passage, i.e. the sleeve bore 44.

When it is desired to disconnect the coupling parts 12 and 14 both handles 86 must be disposed at right angles to the length of the coupling parts to rotate the valves 68 to their closed positions. As the handle extensions 98 of each handle 86 extend over the boss 81 of the interconnected part, and as the clearance between the adjacent boss surface 119, and the extension 98 is close, the extensions 98 and boss surfaces 119 will prevent relative rotation of the coupling parts 12 and 14 when the valves are open as shown in FIG. 1. Thus, it will be appreciated that the surfaces 119 comprise interference surfaces with respect to the handle inner ends 96 and the extensions 98, and when the parts 12 and 14 are fully connected the surfaces 119 are parallel to the plane of rotation of the handles 86. The length of the extensions 98 is sufficient to interfere with a surface 119 until the valves 68 are closed.

In FIG. 1 the handle 86 of the coupling part 14 shown in phantom lines has been pivoted to the closed position, and as such the extension 98 will clear the surface 119 of the boss 81 of the coupling part 12. However, the parts 12 and 14 cannot be relatively rotated until the extension 98 is removed from its superimposed position over the surface 119 of the boss 81 of the coupling part 14, and upon such occurrence the parts 12 and 14 can be relatively rotated to remove the connector fingers 48 from the associated recesses 52 and permit the parts 12 and 14 to be disconnected and separated.

In the rotation of the handles 86 from the open position of FIG. 5 to the closed position of FIG. 3 the valve cam studs 74 will again move across the cam surface wear plate 66 and axially translate the valve 68 inwardly with respect to the plane 64. Accordingly, the axial displacement of the valve prevents interference of the valve operation from the interconnected coupling part components. Once the valve 68 is fully closed as shown in FIG. 3, the valve coupling connection end seal surface 73 will be fully received within the retainer central opening 58 substantially coplanar with the plane 64 eliminating the presence of cavities or voids in which fluid may be trapped which could escape to the atmosphere or ground upon separation of the coupling parts 12 and 14.

It is to be appreciated that because the diameter of the valve bore 70 is large as compared to the diameter of the valve exterior 72 that it would not be possible to achieve the aforedescribed relationship of components to minimize trapped fluid without the axial displacement of the valve. Without the axial displacement of the valve the exterior surface of the valve would pass through the plane 64 as the valve is being rotated between its open and closed positions as represented in FIG. 4. However, the axial displacement of the valve as it rotates between its operative positions assures that the valve will be confined behind the associated plane 64 and no interference between coupling parts can occur during valve operation when the parts are connected.

In FIGS. 1-6 the valve operating handle 86 is of a flat configuration and no apparatus is associated with the handle for locking the valve handle in the valve closed position. In FIGS. 7-9 a security latch is illustrated as mounted upon the valve operating handle and in these figures handle components similar to those previously described are indicated by primed reference numerals.

The handle portion 94' is outwardly offset and a latch 100 is pivotally mounted upon the handle 86' by a pivot 110 wherein the latch may pivot in a plane perpendicular to the length of the handle 86'. A spring 112 disposed about the pivot 110 biases the latch in a clockwise direction as shown in FIG. 9 and the latch includes a hole 114 adapted to selectively receive a padlock shackle if the handle 86' is in the valve closed position. The shell boss 81' is formed with a notch 116 and stop 118 adapted to cooperate with the latch 100 when the handle 86' is in the valve closed position. When the handle 86' is in the position shown in full lines at the left of FIG. 7, and in FIG. 9, wherein the length of the handle is at right angles to the axis of the flow passage, the latch 100 pivots into the notch 116 which is deep enough to expose the entire circumference of the hole 114, FIG. 9, permitting a padlock shackle to be inserted therethrough. In this manner the handle 86' can be locked in the valve closed position. When the handle 86' is rotated to the open position as shown at the right in FIG. 7, and in FIG. 8, the latch 100 is in alignment with the boss notch 121 and as notch 121 is not as deep as notch 116 the latch 100 cannot pivot sufficiently below the handle outer portion 94' to completely expose the padlock hole 114 as shown in FIG. 8. Accordingly, while the notch 121 acts as a valve open detent it is not possible to lock the coupling part valves in the open position.

Figure 10:
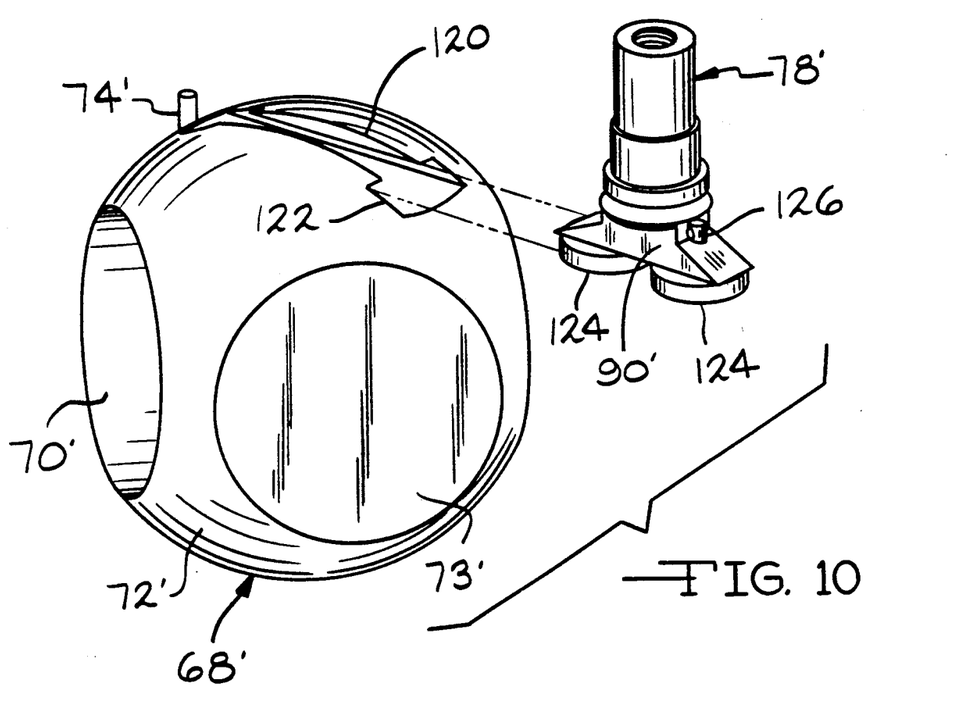
FIG. 10 is an enlarged perspective view illustrating the valve and valve operating shaft utilizing an anti-friction slide.

Frictional forces between the valve slot 76 and the shaft slide 92 can become high during rotation of the valve 68, and such frictional forces are reduced if the slide 92 is formed of a self-lubricating material such as nylon, or the valve 68 itself is formed of a self-lubricating synthetic plastic. Another manner for reducing the frictional forces between the valve and its actuating shaft is shown in FIG. 10. In FIG. 10 similar components to those previously described are represented by primed reference numerals.

The valve 68' includes the bore 70' having an exterior surface 72'. The flat sealing surface 73' is defined upon the exterior surface 72' as previously described, and cam studs 74' extend from the valve 68'.

The slot formed on the valve 68' is shown at 120 and is of a T-slot configuration including an undercut 122. The valve operating shaft 78' includes the inner end 90' and anti-friction rollers 124 are mounted upon the shaft inner end 90' for rotation about roller shafts 126. The rollers 124 are received within the slot undercut 122 and in this manner an anti-friction interrelationship between the shaft 78' and the valve 68' is achieved.

It will be appreciated that various modifications to the inventive concepts may be apparent to those skilled in the art without departing from the spirit and scope of the invention.

I claim:

1. A high flow, low-spill valve coupling part comprising, in combination, an annular housing having a conduit connection end, a coupling connection end and a flow passage defined therethrough having a longitudinal axis and intersecting said ends, said coupling connection end having a general plane substantially perpendicular to said flow passage axis, coupling connectors defined on said coupling connection end, a valve within said flow passage adjacent said coupling connection end having a bore having an axis extending therethrough, valve operating means mounted on said housing operatively connected to said valve for rotating said valve about a valve axis transverse to said bore axis between an open position wherein said valve bore is in communication with said coupling connector end and said housing flow passage and a closed position wherein said valve closes said coupling connection end with respect to said flow passage, annular seal means defined in said flow passage adjacent said coupling connection end sealingly engaging said valve at said open and closed positions of said valve, a generally planar coupling connection end sealing surface defined on said valve, and means axially displacing said valve within said flow passage as said valve rotates between said open and closed positions, said coupling connection end sealing surface being located within said coupling connection end in a substantially coplanar relationship thereto upon said valve being rotated to said closed position.

2. In a valved coupling as in claim 1, said valve comprising a ball valve having a substantially spherical outer surface in engagement with said seal means, said valve bore diametrically extending through said valve and said generally planar coupling connection end sealing surface being defined on said valve outer surface.

3. In a valved coupling as in claim 2, said valve bore having a diameter substantially equal to the effective flow diameter of said housing flow passage.

4. In a valved coupling as in claim 1, said means axially displacing said valve within said flow passage including displacement means defined upon said valve axially displacing said valve within said flow passage as said valve is rotated between said open and closed positions and biasing means biasing said valve toward said seal means in the axial direction of said flow passage.

5. In a valved coupling as in claim 4, said displacement means comprising a cam defined upon said valve, a cam surface defined on said housing, said cam engaging said cam surface as said valve rotates between said open and closed positions.

6. In a valved coupling as in claim 5, said cam comprising a pair of studs mounted on said valve and said cam surface comprising an annular radial surface concentric to said flow passage axis adjacent said seal means.

7. In a valved coupling as in claim 4, wherein said biasing means comprises an annular sleeve concentrically axially moveable within said flow passage engaging said valve, and a compression spring biasing said sleeve into engagement with said valve.

8. In a valved coupling as in claim 4, said valve operating means comprising a shaft rotatably mounted on said housing having an inner end extending into said flow passage toward said valve and an outer end extending from said housing, a handle mounted upon said shaft outer end, an elongated slot defined in said valve, a slot follower defined on said shaft inner end received within said slot, said slot being displaceable with respect to said follower along the length of said slot upon said valve being axially displaced within said flow passage.

9. In a valved coupling as in claim 8, said slot follower including anti-friction means cooperating with said valve slot.

10. In a valved coupling as in claim 9, said anti-friction means comprising a pair of rollers mounted on said shaft inner end received within said slot.

11. A high flow, low-spill valve coupling part comprising, in combination, an annular housing having a conduit connection end, a coupling connection end and a flow passage defined therethrough having a longitudinal axis and intersecting said ends, said coupling connection end having a general plane substantially perpendicular to said flow passage axis, coupling connectors defined on said coupling connection end, a valve within said flow passage adjacent said coupling connection end having a bore having an axis extending therethrough, valve operating means mounted on said housing operatively connected to said valve for rotating said valve about a valve axis transverse to said bore axis between an open position wherein said valve bore is in communication with said coupling connector end and said housing flow passage and a closed position wherein said valve closes said coupling connection end with respect to said flow passage, said valve operating means including adjustable means permitting axial displacement of said valve within said flow passage, annular seal means defined in said flow passage adjacent said coupling connection end sealingly engaging said valve at said open and closed positions of said valve, a generally planar coupling connection end sealing surface defined on said valve, a cam defined on said valve, a cam surface defined on said housing engaged by said cam, said cam and cam surface axially displacing said valve within said flow passage as said valve rotates between said open and closed positions preventing said valve from passing through said coupling connection end general plane as said valve rotates, biasing means biasing said valve toward said annular seal means, said coupling connection end sealing surface being located within said coupling connection end in a substantially coplanar relationship thereto upon said valve being rotated to said closed position.

12. In a valved coupling as in claim 11, said valve comprising a ball valve having a substantially spherical outer surface in engagement with said seal means, said valve bore diametrically extending through said valve and said generally planar coupling connection end sealing surface being defined on said valve outer surface.

13. In a valved coupling as in claim 12, said valve bore having a diameter substantially equal to the effective flow diameter of said housing flow passage.

14. In a valved coupling as in claim 11, said cam comprising a pair of studs mounted on said valve and said cam surface comprising an annular radial surface concentric to said flow passage axis adjacent said seal means.

15. In a valved coupling as in claim 11, an annular sleeve concentrically axially moveable within said flow passage engaging said valve on the opposite side thereof with respect to said seal means, and said biasing means comprising a compression spring biasing said sleeve against said valve to bias said valve toward said seal means.

16. In a valved coupling as in claim 11, said valve operating means comprising a shaft rotatably mounted on said housing having an inner end extending into said flow passage toward said valve and an outer end extending from said housing, a handle mounted upon said shaft outer end said adjustable means comprising, an elongated slot defined in said valve, a slot follower defined on said shaft inner end received within said slot, said slot being displaceable with respect to said follower along the length of said slot upon said valve being axially displaced within said flow passage.

17. In a valved coupling as in claim 16, said slot follower including anti-friction means cooperating with said valve slot.

18. In a valved coupling as in claim 17, said anti-friction means comprising a pair of rollers mounted on said shaft inner end received within said slot.

* * * * *